United States Patent [19]
Porte

[11] Patent Number: 5,729,969
[45] Date of Patent: Mar. 24, 1998

[54] DEVICE FOR BLEEDING OFF AND COOLING HOT AIR IN AN AIRCRAFT ENGINE

[75] Inventor: Alain Porte, Colomiers, France

[73] Assignee: Aerospatiale Societe Nationale Industrielle, Paris, France

[21] Appl. No.: 647,063

[22] Filed: May 9, 1996

[30] Foreign Application Priority Data

May 15, 1995 [FR] France ................ 95 05703

[51] Int. Cl.$^6$ ................ F02C 6/08; F02K 3/04
[52] U.S. Cl. ................ 60/226.1; 60/39.07
[58] Field of Search ................ 60/39.07, 39.83, 60/226.1, 266; 454/71, 76

[56] References Cited

U.S. PATENT DOCUMENTS

| | | |
|---|---|---|
| 3,475,906 | 11/1969 | Madelung. |
| 4,645,415 | 2/1987 | Hovan et al. ................ 60/39.83 |
| 5,123,242 | 6/1992 | Miller ................ 60/226.1 |
| 5,203,163 | 4/1993 | Parsons ................ 60/226.1 |
| 5,319,927 | 6/1994 | Maguire ................ 60/226.1 |
| 5,363,641 | 11/1994 | Dixon et al. . |
| 5,511,374 | 4/1996 | Glickstein et al. ................ 60/39.07 |

*Primary Examiner*—Louis J. Casaregola
*Attorney, Agent, or Firm*—Watson Cole Stevens Davis, P.L.L.C.

[57] ABSTRACT

The present invention relates to a device for bleeding off and cooling hot air in an aircraft engine, including:
- at least one hot air take-off at the outlet of the low pressure and/or high pressure stages of the compressors of the engine,
- a cold air take-off downstream of the fan of the a engine,
- a precooling heat exchanger between said hot air and said cold air, and
- hot air and/or cold air flow rate regulating valves.

According to the invention, said heat exchanger (18) is arranged at the forward part (13A) of the engine (1) support pylon (13), being traversed by said air stream (21) which leaves the fan (6) and is not directed toward the compressors (3).

15 Claims, 5 Drawing Sheets

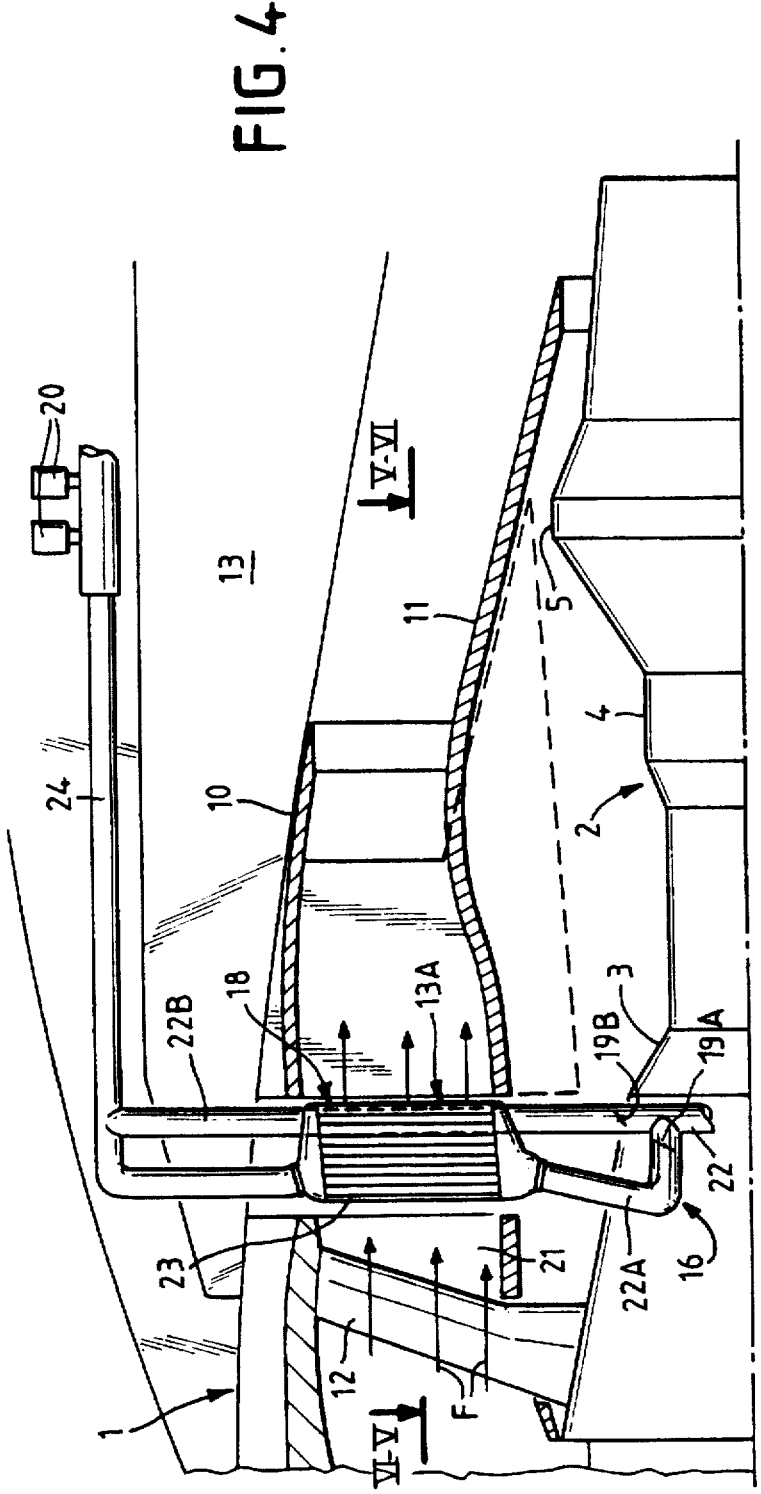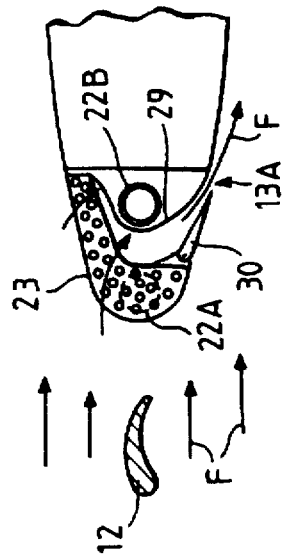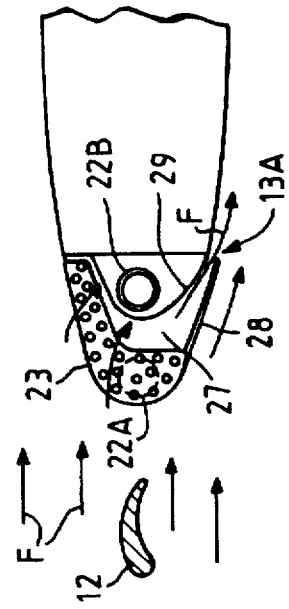

5,729,969

DEVICE FOR BLEEDING OFF AND COOLING HOT AIR IN AN AIRCRAFT ENGINE

FIELD OF THE INVENTION

The present invention relates to a device for bleeding off and cooling hot air in an aircraft engine.

DESCRIPTION OF RELATED ART

In order to provide the air conditioning on board an aircraft, in particular, it is known to bleed off air from the compressors of the aircraft engine (turbo jets especially, more particularly "bypass" turbo jets). A certain quantity of hot and pressurized air is thus bled off at the outlet of the low pressure and/or high pressure compressors of the jet engine. Coming from these different sources, the air has to pass through various control members (valves controlled by thermostats, particularly) before being able to be mixed and metered, after which it is necessary to cool it a first time (precooling) before leading it to the user units: air conditioning unit, deicing system, etc.

Up to the present, in every case, the cooling air is bled off downstream of the fan of the engine before being directed to the precooling heat exchanger, which has the more or less pronounced drawback of impairing the performance of the engine. This is because the precooling heat exchanger (air/air) is, in a known way, generally installed in the pylon which supports the jet engine, linking the wings thereto, in the region of the upper part of the pylon close to the leading edge of the wings. The hot pressurized air coming from the various stages of the compressor or compressors of the engine is cooled by the air coming from the fan, which passes through the exchanger (to which it is led by specific trunking) and is then ejected outward at the upper part of the pylon, in front of the leading edge of the wings.

This results in a significant air loss rate which no longer contributes to the thrust of the engine. Moreover, the fact of ejecting the cooling air outward, as indicated, causes turbulence, drag and aerodynamic disturbances.

SUMMARY OF THE INVENTION

The object of the present invention is to avoid these drawbacks, and it relates to a device for bleeding off and cooling hot air in an aircraft engine, arranged in such a way as to recover a maximum amount of the dynamic pressure, without causing aerodynamic disturbances.

To this end, the device for bleeding off and cooling hot air in an aircraft engine, said engine comprising:

an engine body having compressors, combustion chambers and turbines, a fan arranged upstream of the engine body, a fairing including, from upstream downward in the direction of flow of the air coming from the fan, an air intake, a fan shroud and outer and inner fairings of the air stream originating from the fan, linking arms between the engine body and the fan shroud, and an engine support pylon, connected, on the one hand, to the engine and, on the other hand, to the wings, said device being of the type including:

at least one hot air take-off at the outlet of the low pressure and/or high pressure stages of the compressors of the engine, a cold air take-off downstream of the fan of the engine, a precooling heat exchanger between said hot air and said cold air, and hot air and/or cold air flow rate control valves, is noteworthy, according to the invention, in that said heat exchanger is arranged at the front part of the engine support pylon, being traversed by said air stream which leaves the fan and is not directed toward the compressors.

Hence, the device according to the invention, by virtue of its configuration as defined above, makes it possible, in particular, to recover the thrust by reinjecting the ventilation air from the exchanger into the air of the secondary flow of the engine (cold air stream), and to limit, if not dispensed with, the significant bulk due to the scoops, trunking, outlet grilles which determine the dimensions of the pylon or of the casing of the engine.

Advantageously, said heat exchanger comprises:

a first trunking for bleeding off hot air from the low pressure and/or high pressure compressors of the engine, a perforated shroud, forming the stem of the engine support pylon, arranged transversely in the cold air stream coming from the fan between said outer and inner shrouds of said air stream, and traversed by said trunking along its longitudinal extension, and a second trunking extending into said pylon toward the wings of the aircraft and the user facilities, which is connected to said first trunking.

In a first embodiment of the invention, said first trunking advantageously has a first tapping passing through said shroud and a second tapping, the first and/or the second tapping being equipped with a regulating valve, said first and second tappings extending at least substantially parallel to one another and transversely to the cold air stream, and joining together in the region of said second trunking.

In particular, in this case, said shroud may have a "horseshoe" cross section, corresponding to that of the stem of the pylon, the concavity of which is traversed by said second tapping, the forward part of said shroud being traversed by said first tapping.

Moreover, either the ventilation air, after having passed through the exchanger, is guided within the inner fairing of the air stream coming from the fan, before being evacuated through the outlets provided, respectively, in the region of the combustion chambers and/or the turbines of the engine, or the ventilation air is evacuated through a scoop-type outlet of the exchanger, one branch of the "horseshoe" cross section of the shroud of the exchanger then exhibiting the shape of a wall defining said outlet.

According to an advantageous variant, said wall is a flap, articulated at one end, providing temperature regulation on the ventilation air outlet.

According to another embodiment of the invention, a regulating valve controlling the ventilation air outlet is arranged in a manifold trunking for said air, passing through the heat exchanger and leading to the engine compartment.

In this latter case, said heat exchanger preferably exhibits a semicylindrical shape, bounded by upper and rear partitions, the latter being connected to said pylon.

According to yet another variant of the invention, said heat exchanger has a shroud with a profiled contour of increasing cross section for its connection from one of said linking arms between the engine body and the fan shroud, to the base of said pylon.

Advantageously, said profiled shroud, in the region of its concave face, exhibits an air-permeable surface optimizing the scoop effect.

According to another characteristic of the invention, the regulating valves for the hot air and/or cold air flow rates are controlled by thermostats, provided downstream of said heat exchanger.

BRIEF DESCRIPTION OF DRAWINGS

The figures of the attached drawing will give a good understanding of how the invention can be produced. In these figures, identical references designate similar elements.

FIG. 4 is a figure similar to FIG. 2, illustrating another example embodiment of the device according to the invention.

FIGS. 5 and 6 are sections along the lines V—V and VI—VI respectively of FIG. 4, showing two variants of the embodiment of FIG. 4.

DETAILED DESCRIPTION OF THE PREFERRED EMBODIMENTS

Figure 1:
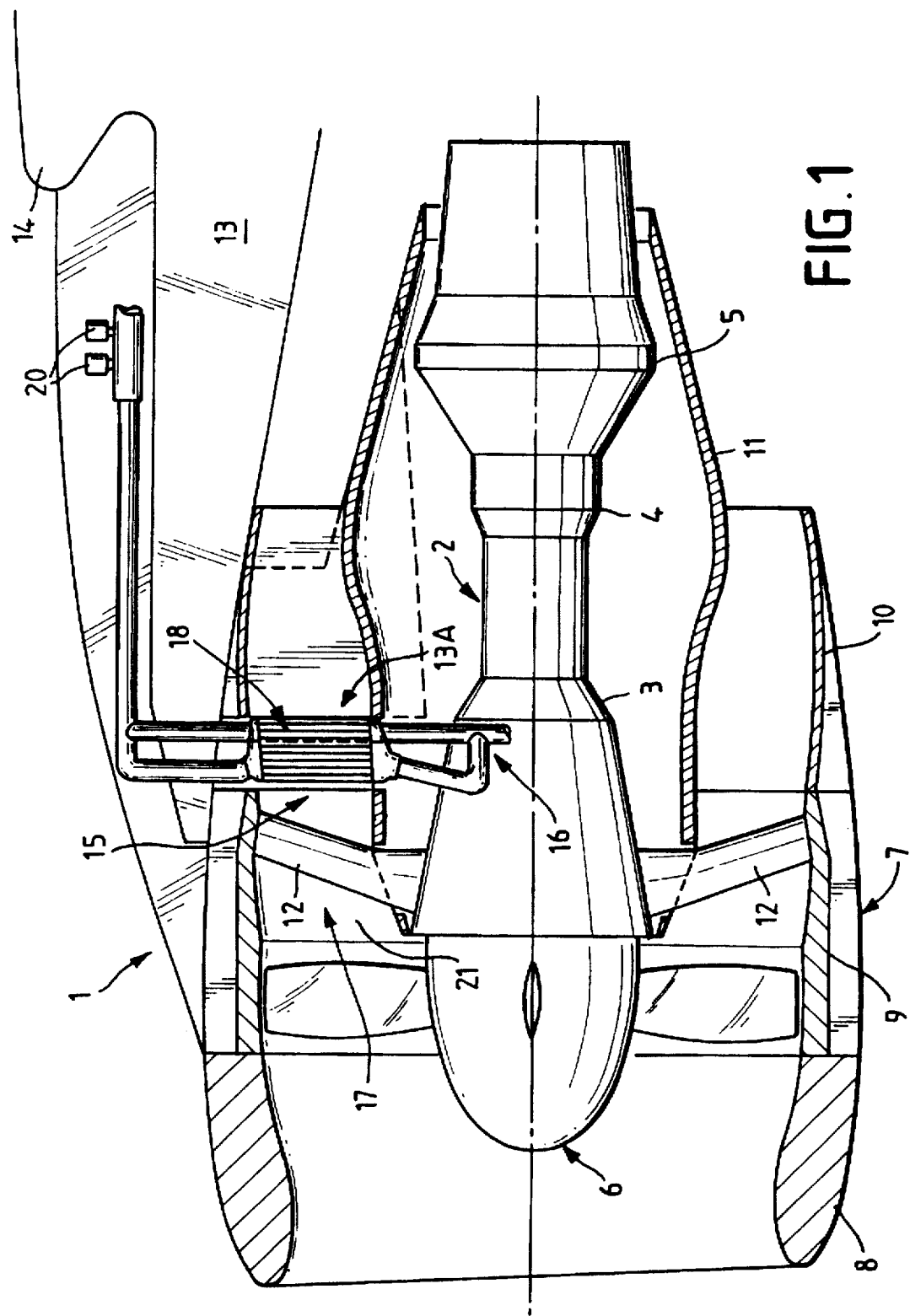
FIG. 1 is a diagrammatic view in longitudinal section of an aircraft engine, showing an example embodiment of the device according to the invention.

In the first place, it is appropriate to describe the general configuration of the aircraft engine 1 represented particularly in FIG. 1.

The "bypass" jet engine shown comprises:

an engine body 2 having compressors 3, combustion chambers 4 and turbines 5, a fan 6 arranged upstream of the engine body 2 and linked thereto, a fairing 7 including, from upstream downward in the direction of flow of the air coming from the fan 6, an air intake 8, a fan shroud proper 9 and outer 10 and inner 11 fairings of the cold air stream, linking arms 12 between the engine body 2 and the fan shroud 9, and a pylon 13 for support of the engine 1, linked, on the one hand, to the engine, and on the other hand, to the wings 14.

It will be noted that the inner fairing 11 of the secondary flow (cold air stream), contains, in addition to the engine body 2, auxiliary elements, such as pumps, alternators, regulators, particularly, which are cooled by an air flow which runs through this compartment from upstream downward.

Moreover, the device 15 for bleeding off and cooling hot air in the engine 1 of the aircraft includes:

a hot air take-off 16 at the outlet of the low pressure and/or high pressure stages of the compressors 3 of the engine, a cold air take-off 17 downstream of the fan 6 of the engine, a precooling heat exchanger 18 between the hot air and the cold air, and hot air and/or cold air flow rate control valves 19 (FIG. 2) or 31 (FIG. 7) which are controlled, for example, by thermostats 20.

More particularly, according to the invention, the heat exchanger 18 is arranged at the front part 13A (stem) of the engine 1 support pylon 13 (or of a fairing of this pylon), being traversed by the cold air stream 21 (FIGS. 2 and 3 particularly) which leaves the fan 6 and is not directed toward the compressors 3. Here, "pylon" therefore designates the pylon itself (structural part) or a fairing thereof (aerodynamic role and role of routing the trunkings, in particular).

Figure 2:
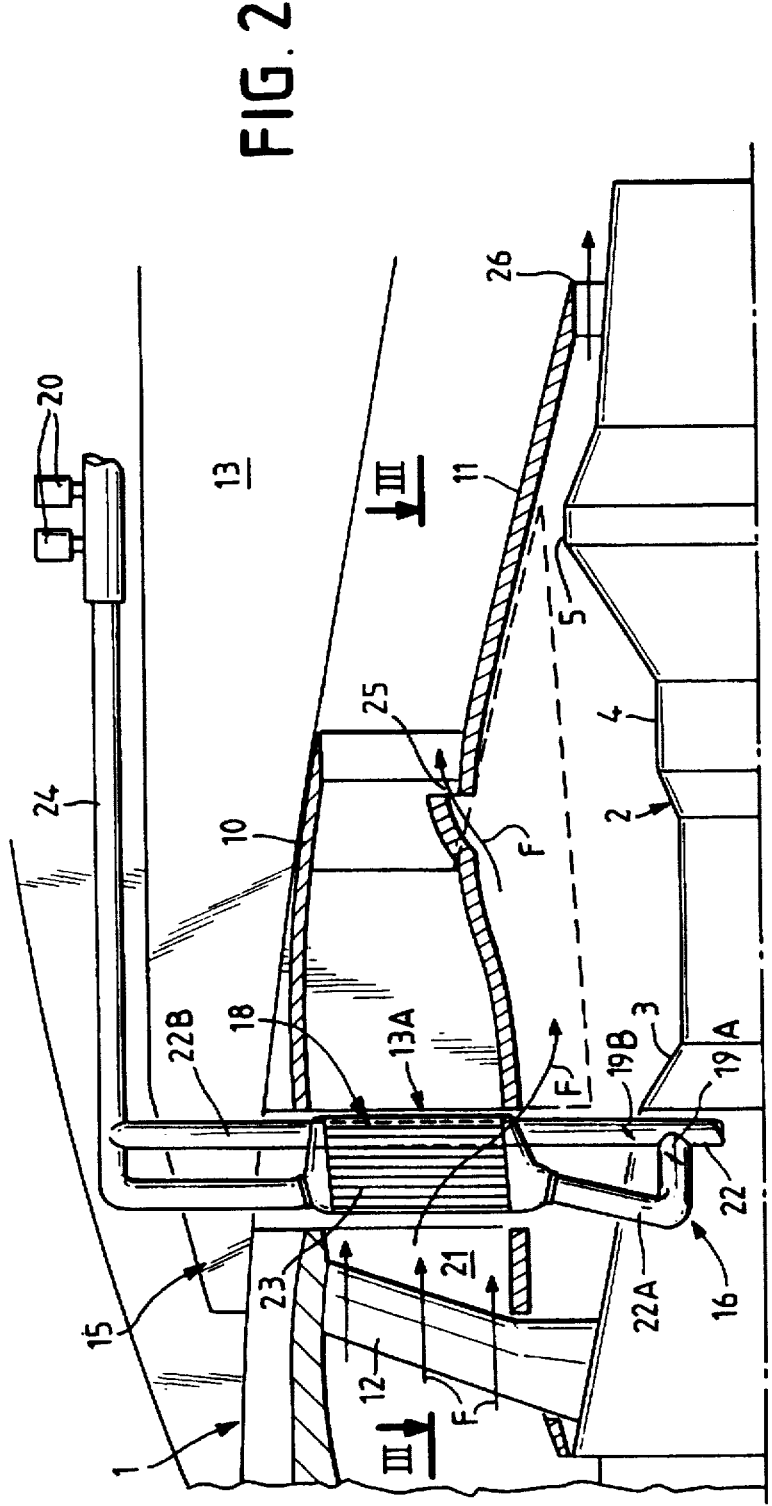
FIG. 2 is a partial enlarged view of FIG. 1.
Figure 3:
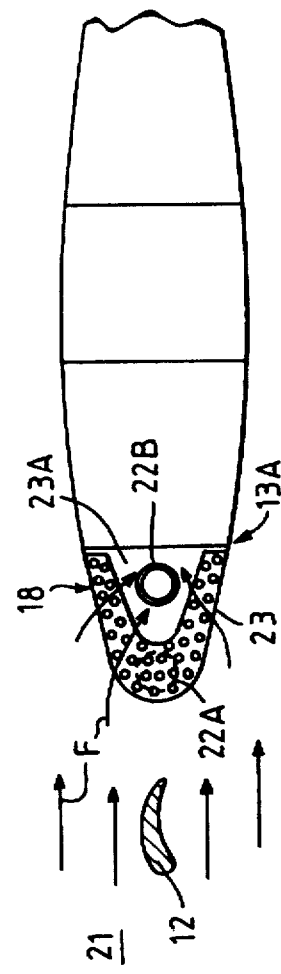
FIG. 3 is a section of FIG. 2 along the line III—III.

As can be seen particularly in FIGS. 2 and 3, in a first embodiment, the heat exchanger 18 generally comprises a first trunking (or flow line) 22 for bleeding off hot air from the low pressure and/or high pressure compressors of the engine, said trunking 22 having a first tapping (or branch line) 22A passing through a perforated shroud 23 of the exchanger, forming the stem 13A of the engine 1 support pylon 13 and arranged transversely (radially) in the cold air stream 21 coming from the fan 6. As shown particularly in FIG. 3, the shroud 23 has a "horseshoe" cross section corresponding to that of the stem 13A, the "concavity" 23A of which is traversed by a second tapping 22B of the trunking 22, the forward part of the shroud being traversed by the first tapping 22A. The two tappings 22A, 22B thus extend at least substantially parallel to one another, and transversely to the cold air stream 21, and join together into a second trunking 24 extending into the pylon 13 toward the wings of the aircraft and the user facilities (not represented). In the example embodiment of FIGS. 2 and 3, valves 19A, 19B controlled by the thermostats 20 arranged on the trunking 24, make it possible to regulate the hot air flow coming from the compressors and passing through the tappings 22A and 22B, while the cold air ventilation is continuous. As shown by the arrows F in FIGS. 2 and 3, the cold air, after having passed through the exchanger 18 (shroud 23) thus cooling the hot air transported by the first tapping 22A (essentially) and the second tapping 22B (secondarily) is guided, in this first example, within the inner fairing 11 of the secondary flow, before being evacuated through the outlets 25 and 26 in the region, respectively, of the combustion chambers 4 and of the turbines 5.

More precisely, the annular outlet 26 can be considered as a simple outlet vent. Moreover, the outlet 25 can further be defined by its position with respect to the trailing edge of the outer fairing 10 where the speed and the pressure of the air are different from those of the atmospheric air, allowing an outlet of specific geometry, called "scoop type" geometry, to work according to a different mode, taking advantage of a suction effect.

The example embodiment of FIGS. 4 and 5 is distinguished from the example embodiment of FIGS. 2 and 3 only by the evacuation of the ventilation air. For that reason, the overall description of the exchanger 18 given with regard to FIGS. 2 and 3 will not be repeated. Put simply, in this case, it can be seen that the cold air ventilation is still continuous, but removed via a scoop outlet 27 of the exchanger 18, the shroud 23 of which then exhibits a cross section similar to that of the example of FIG. 3, but one branch of the "horseshoe" of which is replaced by a single wall 28 defining the outlet 27, while the tapping 22B is isolated by a rounded wall 29. This configuration makes it possible to enhance the suction phenomenon.

A variant of this embodiment is shown in FIG. 6. In this case, the wall 28 is replaced by a flap 30, articulated at its end linked to the shroud 23, providing temperature regulation on the cold air outlet. Ventilation is then not continuous, but regulated.

It is also seen that, in the case of FIGS. 2 and 3, the ventilation air "exits" essentially outside the fairing 10, whereas, in the case of FIGS. 4-6, the ventilation air exits within this fairing 10.

Figure 7:
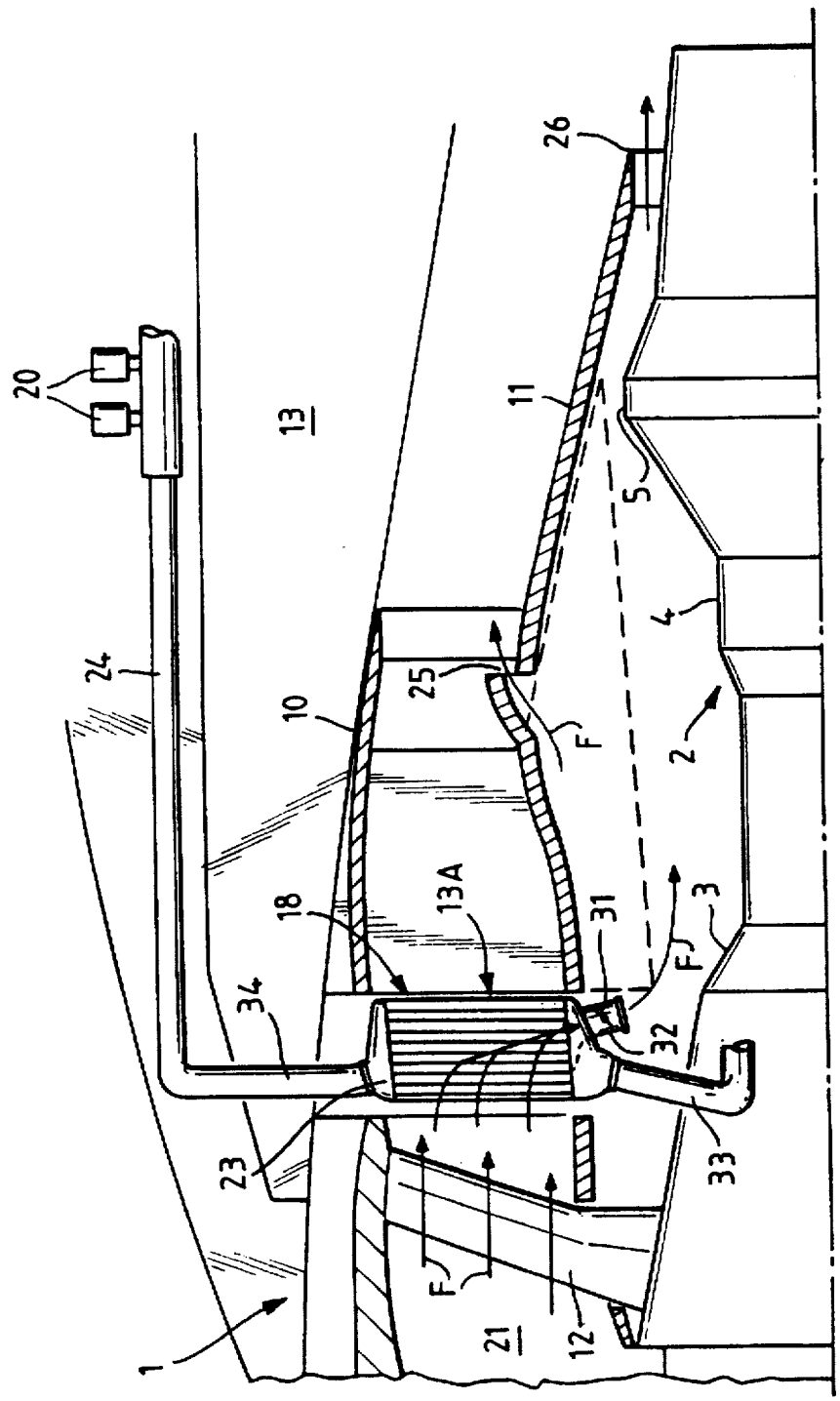
FIG. 7 shows, in longitudinal section, another example of the arrangement of the device according to the invention.
Figure 8:
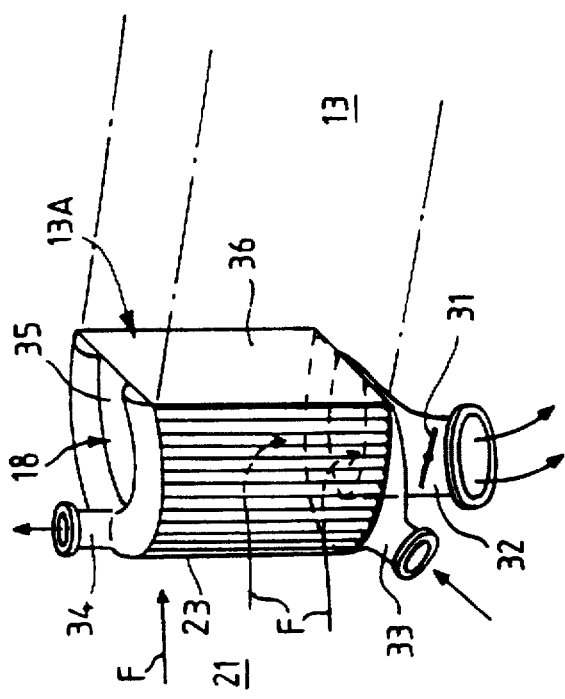
FIG. 8 is a diagrammatic view in perspective of the heat exchanger of FIG. 7.

For an overall design relating to the preceding cases, the example embodiment of FIGS. 7 and 8 is distinguished therefrom by a regulating valve 31, controlling the cold air outlet, arranged in a manifold trunking 32 for said air passing through the heat exchanger 18, this trunking 32 leading to the engine compartment 2.

In this case, the hot air re-enters the exchanger 18 via a conduit 33, at the lower part of the exchanger 18, and leaves by a conduit 34 connected to the conduit 24 leading to the user facilities (not represented). As can be seen in FIG. 8, the exchanger 18 exhibiting a semicylindrical form is moreover bounded by upper 35 and rear 36 partitions, the latter connected to the pylon 13.

As in the example embodiment of FIGS. 2 and 3, the ventilation air is then evacuated through the outlets 25, 26 (arrows).

As was seen above in the overall description of the aircraft engine 1, a plurality of linking arms (or fins) 12, constituting a set of several tens of elements, are provided between the engine body 2 and the fan shroud 9. This set of fins has two main roles: the first is mechanical (link between shrouds) and the second aerodynamic. The fins straighten out the rotating air flow pushed back by the fan, which, by obtaining an increase in thrust, enhances the performance of the engine while rendering the installation of the pylon less difficult.

Figure 9:
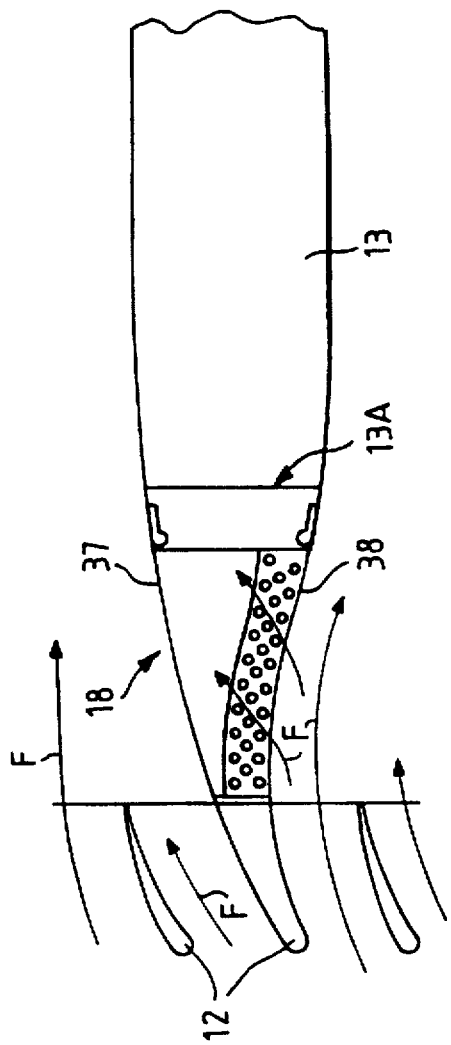
FIG. 9 illustrates another variant of the device of the invention.

FIG. 9 illustrates a variant of the invention, in which the aerodynamics of the exchanger 18 are enhanced by modifying the cross section of a fin 12 in order to allow direct connection between said fin and the exchanger, the latter exhibiting the profiled contour 37, represented in FIG. 9, of a cross section increasing from the fin up to the base of the pylon 13, which provides a better flow of air, while preserving the same capabilities for exchange and regulation within the exchanger.

More particularly, in this case, the profiled exchanger 18, in the region of its concave face 38, exhibits an air-permeable surface, such as a perforated sheet metal, optimizing the scoop effect while limiting the disturbances of the flow of engine air. Yet again, all the principles of temperature regulation on the cold air or the hot air passing through the respective conduits are applicable in this variant.

In a general way, the invention thus makes it possible to create a phenomenon of suction of the air coming from the fan through the outer skin of the exchanger, so as to limit the aerodynamic drag created by a bifurcation in an engine air stream, trying to maintain a laminar flow as long as possible. In other words, it is a question of enhancing the aerodynamic flow by sucking in the boundary layer, which has the advantage of reducing the drag and allows the heat exchanger to play an appreciable role in addition to its primary function.

I claim:

1. A device for bleeding off and cooling hot air in an engine of an aircraft, the aircraft having a body, said engine comprising:

an engine body having a compressor, a combustion chamber and a turbine, the engine defining an upstream direction and a downstream direction;

a fan arranged in the upstream direction from the engine body, for causing a flow of cold air in the downstream direction;

a fairing assembly comprising an air intake, a fan shroud and outer and inner fairings;

linking means for connecting the engine body and the fan shroud; and engine support means for connecting the engine to the body of the aircraft; said device comprising:

a first flow line for bleeding off the hot air from the compressor;

a perforated shroud arranged transversely in the flow of the cold air and traversed by said first flow line; and a second flow line, connected to said first flow line, for receiving the hot air which has passed through the first flow line and the perforated shroud and for conveying the hot air to the body of the aircraft.

2. The device as claimed in claim 1, wherein said first flow line comprises:

a first branch line passing through said shroud;

a second branch line extending at least substantially parallel to the first branch line and transversely to the flow of the cold air; and a regulating valve disposed in at least one of the first branch line and the second branch line for regulating a flow of the hot air through said at least one of the first branch line and the second branch line;

said first branch line and said second branch line joining together to discharge said hot air into said second flow line.

3. The device as claimed in claim 2, wherein:

said shroud has a horseshoe cross section to define (i) a convex portion facing into the flow of the cold air and (ii) a concave portion at least partially enclosing a space;

the space at least partially enclosed by the concave portion is traversed by said second branch line; and the convex portion is traversed by said first branch line.

4. The device as claimed in claim 3, further comprising means for guiding the cold air, after the cold air has passed through the device, into the inner fairing so that the cold air having passed through the device is evacuated through the fairing assembly.

5. The device as claimed in claim 3, wherein the shroud comprises a wall portion defining an outlet through which the cold air having passed through the device is evacuated from the device.

6. The device as claimed in claim 5, wherein said wall portion comprises:

a flap having an end; and articulation means for attaching the flap to a remainder of the shroud so that the flap is articulated at the end.

7. The device as claimed in claim 1, further comprising:

a manifold line for conveying said cold air passing through the device into the fairing assembly; and a regulating valve disposed in said manifold line for controlling a flow of the cold air through the manifold line.

8. The device as claimed in claim 7, wherein said device has a semicylindrical shape and further comprises an upper partition and a rear partition, the rear partition being connected to said engine support means.

9. The device as claimed in claim 1, wherein said shroud has a cross section which increases from a vicinity of said linking means to a vicinity of the engine support means.

10. The device as claimed in claim 9, wherein said shroud comprises a concave face with an air-permeable surface.

11. The device as claimed in claim 1, further comprising:

at least one regulating valve means for regulating a flow of at least one of the hot air and the cold air through the device; and thermostat means, provided on the second flow line, for effecting control of the at least one regulating valve means in accordance with a temperature of the hot air in the second flow line.

12. The device as claimed in claim 1, wherein:

the body of the aircraft comprises a wing;

the engine support means comprises a pylon for connecting the engine to the wing; and the device is attached to the pylon.

13. The device as claimed in claim 12, wherein the second flow line extends into the aircraft through the wing.

14. The device as claimed in claim 3, wherein:

the engine support means comprises a pylon having a forward surface facing the flow of the cold air;

the device is attached to the forward surface of the pylon; and the space is enclosed by the concave portion of the shroud and the forward surface of the pylon.

15. The device as claimed in claim 2, wherein:

the first branch line comprises a plurality of ducts, each having a diameter; and the second branch line comprises a duct having a diameter, the diameter of the duct of the second branch line being greater than the diameter of any of the plurality of ducts of the first branch line.

* * * * *